United States Patent
Rogers

[11] 3,922,072
[45] Nov. 25, 1975

[54] BIOCULAR MAGNIFYING LENSES

[75] Inventor: Philip John Rogers, Prestatyn, Wales

[73] Assignee: Pilkington P. E. Limited, Wales

[22] Filed: Aug. 15, 1974

[21] Appl. No.: 497,694

Related U.S. Application Data

[63] Continuation-in-part of Ser. No. 329,390, Feb. 5, 1973, abandoned.

[30] Foreign Application Priority Data

Feb. 17, 1972 United Kingdom............ 7510/72

[52] U.S. Cl.............. 350/220; 350/175. E; 350/202; 350/229
[51] Int. Cl.² ................................. G02B 25/00
[58] Field of Search........ 350/175 E, 204, 220, 229, 350/202

[56] References Cited
UNITED STATES PATENTS
3,614,209   10/1971   Seaman...................... 350/175 E X
3,658,412   4/1972    Seaman...................... 350/175 E X

FOREIGN PATENTS OR APPLICATIONS
461,062   6/1928   Germany ..................... 350/229

*Primary Examiner*—John K. Corbin
*Attorney, Agent, or Firm*—Mattern, Ware and Davis

[57] ABSTRACT

A biocular magnifying lens comprises from front to back a first positive bi-convex element, a second positive bi-convex element and a positive meniscus element convex towards the front, a negative meniscus element concave towards the front being interposed between the first positive bi-convex element and the second positive bi-convex element and/or between the second positive bi-convex element and the positive meniscus element such that the lens may be used as an eyepiece in a night vision device.

19 Claims, 9 Drawing Figures

BIOCULAR MAGNIFYING LENSES

This application is a continuation-in-part of my U.S. Pat. application Ser. No. 329,390, filed Feb. 5, 1973 now abandoned.

This invention concerns improvements in or relating to lenses and relates more particularly to biocular magnifying lenses suitable for use, for example, as eyepieces in night vision devices.

Night vision devices are known in which an image is formed on a phosphor which is too small for convenient viewing by the unaided eye. An eyepiece is therefore required to magnify this image and re-image it at a convenient distance in front of the observer for comfortable viewing. Most commonly monocular eyepieces are used but, as is known by those conversant with the art, biocular eyepieces can have advantages over monocular eyepieces. However, as is also known by those conversant with the art, considerable problems arise in the design of adequately corrected biocular eyepieces. Such problems stem, in particular, from the large exit pupil diameter relative to focal length necessary for biocular viewing at a reasonable magnification and the fact that biocular viewing by definition involves viewing from two points at a fixed separation, i.e. the two separate eyes. Thus there can be an angular difference in geometry between the separate images seen by the two eyes over the biocular portion of the field of view.

It is an object of the present invention to provide an improved magnifying lens suitable for biocular use.

According to the present invention there is provided a biocular magnifying lens faster than f/1.0 having a front part, a middle part, and a back part, the front part being convergent and having a focal length between +3F and +12F, where F is the focal length of the complete lens, the middle part being convergent and having a focal length between +1.6F and +2F, there being a divergent element included in at least one of the front and middle parts, and the back part being convergent and having a focal length between +1F and +1.75F, the back part comprising a component convex towards the front, and in which lens spherical aberration introduced by convergent elements is corrected by at least one front surface of at least one divergent element, astigmatism is controlled by the spacing between the middle and back parts, and the parts are arranged to effect coma correction.

The back part preferably comprises a meniscus component convex towards the front, the ratio of the radius of curvature of the front surface of the maniscus component to the radius of curvature of its back surface being between +0.5 and zero. Thus the back surface of the back part may be concave and may at least partially correct field curvature. However, if desired, the back part may comprise a convex-plano component convex towards the front, or even a bi-convex component. In the latter case the ratio of the radius of curvature of the front surface to the radius of curvature of the back surface is preferably between zero and −1.5.

The light path through the lens may be bent through an angle by means of a prism interposed between the middle part and the back part, which prism may be cemented to the back surface of the middle part. For example, a 45°, 45°, 90° prism may be interposed to bend the light path through a right angle.

The front part of the lens may comprise a convergent element and a divergent element, the convergent element preferably having a focal length between +1.75F and +4.75F, and the divergent element preferably having a focal length between −2.5F and ∞.

The middle part of the lens may comprise a convergent element and a divergent element which may be formed into a doublet and which are preferably cemented together. The convergent element preferably has a focal length between +1F and +2F and is preferably of crown glass, and the divergent element preferably has a focal length betwen −1.5F and ∞ and is preferably of flint glass.

One embodiment of lens in accordance with the invention comprises from front to back, a first positive bi-convex element, a negative meniscus element concave towards the front, a second positive bi-convex element, and a positive meniscus element convex towards the front. The radius of curvature of the back face of said second positive bi-convex element may approach infinity so that the element is effectively convex-plano. Similarly the back surface of said positive meniscus element may have a radius of curvature approaching infinity so that the element is effectively convex-plano. A prism may be interposed between the back positive meniscus element and the second positive bi-convex element.

Another embodiment of lens in accordance with the invention comprises from front to back, a first positive bi-convex element, a second positive bi-convex element, a negative meniscus element concave towards the front, and a positive meniscus element convex towards the front. Said negative meniscus element may have a back face whose radius of curvature approaches infinity so that the element is effectively concave-plano. Similarly the radius of curvature of the back face of said positive meniscus element may approach infinity so that the element is effectively convex-plano. Preferably the second positive bi-convex element and the negative meniscus element are of crown and flint glass respectively and are cemented together to form a doublet. A prism may be interposed between the back positive meniscus element and the adjacent negative meniscus element, and may be cemented to the latter which, in this case, is preferably concave-plano as mentioned above.

A further embodiment of lens in accordance with the invention comprises from front to back, a first positive bi-convex element, a first negative meniscus element concave towards the front, a second positive bi-convex element, a second negative meniscus element, concave towards the front, and a positive meniscus element convex towards the front. The radius of curvature of the back face of said second negative meniscus element may approach infinity so that the element is effectively concave-plano. Similarly the radius of curvature of the back face of said positive meniscus element may approach infinity so that the element is effectively convex-plane. The second positive bi-convex element and the second negative meniscus element are preferably of crown and flint glass respectively and are preferably cemented together to form a doublet. A prism may be interposed between the back positive meniscus element and the adjacent second negative meniscus element, and may be cemented to the latter which, in this case, is preferably concave-plano as mentioned above.

In order that the invention may be better understood reference will now be made to the accompanying drawings which show, by way of example, embodiments of biocular magnifying lenses in accordance with the invention and in which.

Figure 1:
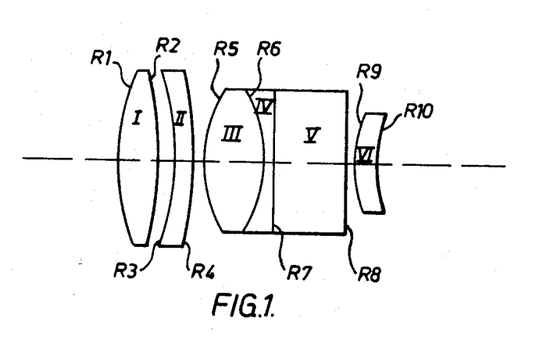
FIG. 1 is a diagrammatic representation of one embodiment of lens.

The embodiment of lens shown in FIG. 1 comprises from front to back, i.e., from left to right as viewed in the drawing, elements I to VI. I is a bi-convex positive element. II is a negative meniscus element concave towards the front. III is a bi-convex positive element. IV is a negative meniscus (or concave-plano) element concave towards the front. V is a 45°, 45°, 90° prism. VI is a positive meniscus (or convex-plano) element convex towards the front.

It will be understood that the prism V bends the light path through a right angle and therefore that the back element VI is in fact positioned on an axis at right angles to the rest of the optical system. FIG. 1 shows the lens in 'straight through' form for convenience and in the interests of clarity.

The element III, which is of crown glass, is cemented to the element IV, which is of flint glass, to form a doublet. The prism V is shown cemented to the element IV, although this is not essential.

The elements I and II form a convergent front part of the lens having a focal length between +3.0F and +12.0F where F is the focal length of the complete lens. The elements III and V form a convergent middle part of the lens having a focal length between +1.6F and +2.0F. The element VI forms a convergent back part of the lens having a focal length between +1.0F and +1.75F.

The lens is faster than F/1.0. Spherical aberration introduced by the convergent elements is corrected by the front surfaces, indicated as R3 and R6 of the divergent elements II and IV. Astigmatism is controlled by the spacing between the front surface, indicated as R9, of the element VI and the back surface, indicated as R7, of the element IV. Field curvature may be at least partially corrected by the back surface, indicated as R10, of the element VI unless said back surface is planar, and the elements are arranged to effect coma correction.

It will be understood that the magnifying system can be optimised to give a sufficiently corrected and registered image to both eyes for a considerable range of glass types and therefore refractive indices and constringences for most of the elements in the system. These optimisations result in a relatively wide variation of power of each glass element and each part of the optical system. The possible range of glass materials plus the optional insertion of a bending (right angle or other angle) prism also gives rise to wide variation of lens element thicknesses and separations of lens elements or parts of the optical system.

The focal lengths of the individual elements shown in FIG. 1 lie within the ranges indicated in the following table:

| Element | Focal Length |
| --- | --- |
| I | between +1.75F and +4.75F |
| II | between −2.5F and ∞ |
| III | between +1.0F and +2.0F |
| IV | between −1.5F and ∞ |
| VI | between +1.0F and +1.75F |

As is more fully explained later, either the element II or the element IV may be omitted from the system but the elements II and IV are not both omitted simultaneously. Thus the focal lengths of the elements II and IV will not both be infinite at the same time.

The surfaces of the elements, indicated from front to back as R1 to R10, have radii of curvature which accord with the following requirements.

The ratio of R1:R2 is between −1.4 and 0
The ratio R2:R3 is between ∞ and +1.2
The ratio R3:R4 is between 0 and 1.0
R5 is between +1.5F and +0.95F
R6 is between −1.2F and ∞
The ratio R9:R10 is between 0.50 and 0

The axial thicknesses of the individual elements lie within the ranges indicated in the following table:

| Element | Axial Thickness |
| --- | --- |
| I | between 0.15F and 0.55F |
| II | between 0.01F and 0.24F |
| III | between 0.27F and 0.81F |
| IV | between 0.01F and 1.02F |
| V | up to 0.97F |
| VI | between 0.17F and 0.52F | the combined axial thicknesses of elements IV and V being between 0.01F and 1.02F The axial separations, or air gaps, between faces of elements lie within the following ranges:

| Between faces | Gap |
| --- | --- |
| R2 and R3 | up to 0.34F |
| R4 and R5 | up to 0.16F |
| R8 and R9 | up to 0.43F |

The individual elements are made of glass having refractive indices within the ranges indicated in the following table:

| Element | Refractive index |
| --- | --- |
| I | N1 between 1.48 and 1.72 |
| II | N2 between 1.51 and 1.86 |
|  | N2-N1 being between −0.10 and +0.35 |
| III | N3 between 1.50 and 1.77 |
| IV | N4 between 1.57 and 1.95 |
|  | N4-N3 being between +0.10 and +0.40 |
| V | N5 between 1.50 and 1.95 |
| VI | N6 between 1.50 and 1.85 |

The constringences of the elements lie within the following indicated ranges:

| Element | Constringence |
| --- | --- |
| I | V1 between 44 and 71 |
| II | V2 between 22 and 65 |
|  | V1-V2 being between −5 and +46 |
| III | V3 between 45 and 65 |
| IV | V4 between 21 and 41 |

-continued

| Element | Constringence |
|---|---|
| | V3-V4 being between 0 and +45 |
| V | V5 between 21 and 68 |
| VI | V6 between 35 and 68 |

From the foregoing it will be seen that element II, referred to as a negative meniscus concave towards the front, may have a back surface R4 with a radius of curvature approaching infinity so that the element is effectively concave-plano. However, this will generally not be the case when (as more fully explained later) the second negative meniscus element IV is not present in the system.

Figure 2:
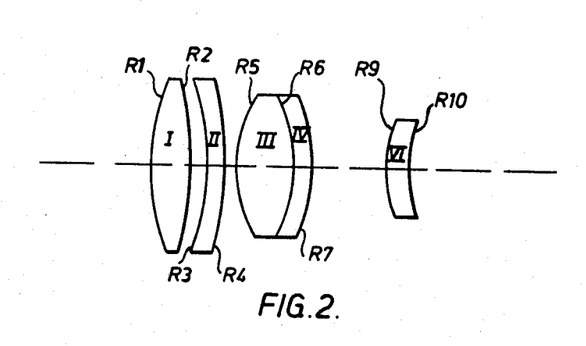
FIGS. 2 and 2A each show a diagrammatic representation of a lens similar to that shown in FIG. 1 but omitting a prism element.

From the foregong it will also be seen that element IV, referred to as a negative meniscus concave towards the front, may have a back face R7 with a radius of curvature approaching infinity. Thus element IV may effectively be concave-plano and where, as shown in FIG. 1, a prism element V is included in the lens and cemented to the back face R7, the latter would usually be planar. However, the prism element V may be omitted, in which case the back face R7 of element IV may be convex as shown in FIG. 2, the radius of curvature of R7 then being between −6.0F and ∞.

It will further be seen that the back face R10 of element VI, referred to as a positive meniscus convex towards the front, may have a radius of curvature which approaches infinity and element VI may therefore be effectively convex-plano, in which case its back surface, which normally provides partial field curvature correction, has no effect on field curvature.

Figure 3:
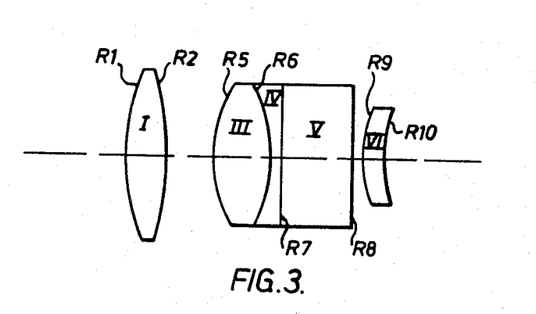
FIG. 3 is a diagrammatic representation of another embodiment of lens.
Figure 4:
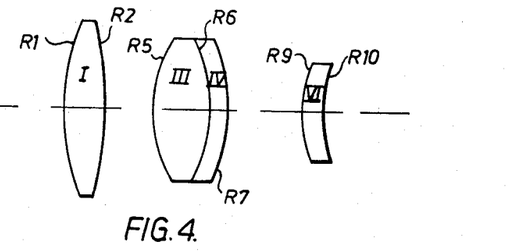
FIG. 4 is a diagrammatic representation of a lens similar to that shown in FIG. 3 but omitting a prism element, FIGS. 5, 5A and 5B each show a diagrammatic representation of a further embodiment of lens.

FIG. 3 shows another embodiment of lens which is basically similar to that of FIG. 1 but which omits the divergent element II. Thus with this embodiment the front convergent part of the lens consists of a bi-convex positive element I. Spherical aberration introduced by the convergent elements is corrected by the front surface R6 of the divergent element IV. As described above with reference to FIG. 1 the prism element V, shown in FIG. 3, may be omitted as shown in FIG. 4 if bending of the light path is not required.

Figure 5:
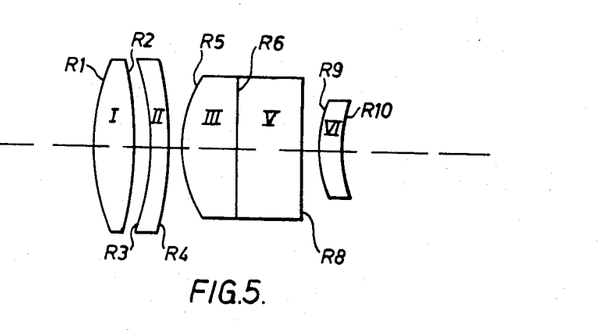

FIG. 5 shows a further embodiment of lens which is basically similar to that of FIG. 1 but which omits the divergent element IV, the divergent meniscus element II being retained. Thus with this embodiment the middle convergent part of the lens consists of a bi-convex positive element III whose back face may, as shown in FIG. 5, have a radius of curvature approaching infinity so that the element is effectively convex-plano. A prism element V can then be cemented to the back face of the element III as shown in FIG. 5. However, as previously explained, the prism element V may be omitted and the back face of the element III may then be convex as shown in FIG. 6.

Figure 6:
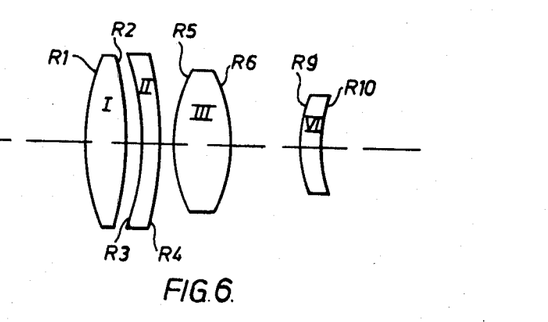
FIG. 6 is a diagrammatic representation of a lens similar to that shown in FIG. 5 but omitting a prism element.

In the embodiments shown in FIGS. 5 and 6 spherical aberration introduced by the convergent elements is corrected by the front face R3 of the divergent element II.

In all the embodiments shown in FIGS. 1 to 6 the back element VI, referred to as a positive meniscus convex towards the front, may have a back surface R10 which is concave or planar as described above. It will be understood by those skilled in the art that, if desired, the back meniscus (or convex-plano) element VI may be replaced by a bi-convex element, for example if the lens is to be used in conjunction with a curved fibre-optic faceplate. If the element VI is made bi-convex, then the ratio of the radius of curvature of its front surface (R9) to the radius of curvature of its back surface (R10) is preferably between 0 and −1.5.

It will be appreciated that, if desired, elements in the lens, including the prism V if present, may be truncated, i.e. the elements may have a greater physical dimension in the direction corresponding to the line between the observer's eyes than in the direction perpendicular thereto.

Particular specific examples of lenses according to the above described embodiments are as follows, the dimensional units in the examples being millimeters. It will be noted that some of the examples include a perspex window element which can be located against a cathode ray tube whose phosphor is viewed through the lens.

The following Examples 1.1 to 1.4 relate to the embodiment shown in FIG. 1:

EXAMPLE 1.1

| Element | Surface | Radius of Curvature | Thickness/ Separation | Refractive Index Nd | Constringence V |
|---|---|---|---|---|---|
| I | R1 | +120.18 | | | |
| | | | 15.60 | 1.5165 | 64.2 |
| | R2 | −120.18 | | | |
| | | | 3.80 | | |
| II | R3 | −85.52 | | | |
| | | | 4.13 | 1.7004 | 30.3 |
| | R4 | −167.79 | | | |
| | | | 0.25 | | |
| III | R5 | +47.19 | | | |
| | | | 25.07 | 1.6204 | 60.3 |
| | R6 | +98.83 | | | |
| IV | | | 1.89 | 1.7484 | 27.8 |
| | R7 | Plano | | | |
| V | | | 31.85 | 1.7484 | 27.8 |
| | R8 | Plano | | | |
| | | | 0.25 | | |
| VI | R9 | +34.45 | | | |
| | | | 14.41 | 1.7440 | 44.8 |
| | R10 | +112.72 | | | |
| | | | 2.33 | | |
| | R11 | Plano | | | |
| Perspex Window | | | 1.42 | 1.4937 | 57.4 |
| | R12 | Plano | | | |

EXAMPLE 1.1-continued

| Element | Surface | Radius of Curvature | Thickness/ Separation | Refractive Index Nd | Constringence V |
|---|---|---|---|---|---|
| EFL 44.41 | | | F/0.56 | 50 Degrees Field of View | |

EXAMPLE 1.2

| Element | Surface | Radius of Curvature | Thickness/ Separation | Refractive Index Nd | Constringence V |
|---|---|---|---|---|---|
| I | R1 | +120.18 | 15.60 | 1.5165 | 64.2 |
| | R2 | −120.18 | | | |
| | | | 3.80 | | |
| II | R3 | −85.52 | 4.13 | 1.7004 | 30.3 |
| | R4 | −167.79 | | | |
| | | | 0.25 | | |
| III | R5 | +47.19 | 25.07 | 1.6204 | 60.3 |
| | R6 | −98.83 | | | |
| IV | | | 1.89 | 1.7484 | 27.8 |
| | R7 | Plano | | | |
| V | | | 31.85 | 1.7484 | 27.8 |
| | R8 | Plano | | | |
| | | | 0.25 | | |
| VI | R9 | +32.13 | 13.59 | 1.6204 | 60.3 |
| | R10 | +144.40 | | | |
| | | | 2.56 | | |
| | R11 | Plano | | | |
| Perspex Window | | | 1.42 | 1.4937 | 57.4 |
| | R12 | Plano | | | |
| EFL 45.36 | | | F/0.576 | 49 Degrees Field of View | |

EXAMPLE 1.3

| Element | Surface | Radius of Curvature | Thickness/ Separation | Refractive Index Nd | Constringence V |
|---|---|---|---|---|---|
| I | R1 | +120.18 | 15.60 | 1.5165 | 64.2 |
| | R2 | −120.18 | | | |
| | | | 3.80 | | |
| II | R3 | −85.52 | 4.13 | 1.7004 | 30.3 |
| | R4 | −167.79 | | | |
| | | | 0.25 | | |
| III | R5 | +47.19 | 25.07 | 1.6204 | 60.3 |
| | R6 | −98.83 | | | |
| IV | | | 1.89 | 1.7484 | 27.8 |
| | R7 | Plano | | | |
| V | | | 31.85 | 1.7484 | 27.8 |
| | R8 | Plano | | | |
| | | | 0.25 | | |
| VI | R9 | +35.13 | 14.41 | 1.7844 | 43.9 |
| | R10 | +108.60 | | | |
| | | | 2.42 | | |
| | R11 | Plano | | | |
| Perspex Window | | | 1.42 | 1.4937 | 57.4 |
| | R12 | Plano | | | |
| EFL 44.21 | | | F/0.561 | 50 Degrees Field of View | |

EXAMPLE 1.4

| Element | Surface | Radius of Curvature | Thickness/ Separation | Refractive Index Nd | Constringence V |
|---|---|---|---|---|---|
| I | R1 | +293.48 | 17.78 | 1.5165 | 64.2 |
| | R2 | −211.90 | | | |
| | | | 5.08 | | |
| II | R3 | −140.06 | 6.10 | 1.7004 | 30.3 |
| | R4 | −286.30 | | | |
| | | | 0.25 | | |

EXAMPLE 1.4-continued

| Element | Surface | Radius of Curvature | Thickness/ Separation | Refractive Index Nd | Constringence V |
|---|---|---|---|---|---|
| III | R5 | +52.69 | | | |
| | | | 30.48 | 1.6204 | 60.3 |
| | R6 | −64.87 | | | |
| IV | | | 3.05 | 1.7484 | 27.8 |
| | R7 | Plano | | | |
| V | | | 38.1 | 1.62040 | 60.3 |
| | R8 | Plano | | | |
| | | | 0.25 | | |
| VI | R9 | +37.61 | | | |
| | | | 19.18 | 1.7844 | 43.9 |
| | R10 | +141.41 | | | |
| | | | 5.78 | | |

EFL 51.88      F/0.659      44 Degress Field of View

Figure 2A:
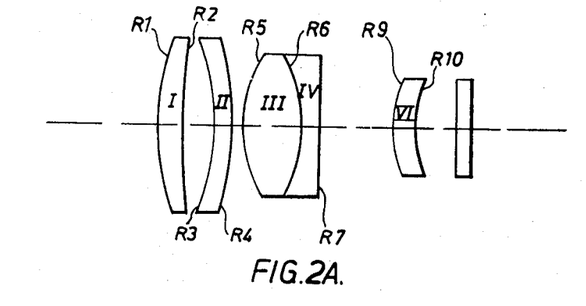

The following Examples 2.1 and 2.2 relate to the embodiment shown in FIG. 2, which omits the prism element V, and illustrate how the lens can be re-optimised with such omission and the Example 2.3 relates to the embodiment of FIG. 2A in which the surface R2 is slightly concave, the prism element V is omitted, and the surface R7 plano.

EXAMPLE 2.1

| Element | Surface | Radius of Curvature | Thickness/ Separation | Refractive Index Nd | Constringence V |
|---|---|---|---|---|---|
| I | R1 | +80.22 | | | |
| | | | 15.60 | 1.5165 | 64.2 |
| | R2 | −129.41 | | | |
| | | | 3.80 | | |
| II | R3 | −91.44 | | | |
| | | | 4.13 | 1.7004 | 30.3 |
| | R4 | −571.42 | | | |
| | | | 0.25 | | |
| III | R5 | +55.78 | | | |
| | | | 30.48 | 1.6204 | 60.3 |
| | R6 | −60.70 | | | |
| IV | | | 3.50 | 1.7484 | 27.8 |
| | R7 | −484.54 | | | |
| | | | 10.04 | | |
| VI | R9 | +46.24 | | | |
| | | | 24.96 | 1.7440 | 44.8 |
| | R10 | +225.37 | | | |
| | | | 2.89 | | |
| | R11 | Plano | | | |
| Perspex Window | | | 1.42 | 1.4937 | 57.4 |
| | R12 | Plano | | | |

EFL 48.34      F/0.614      48 Degrees Field of View

EXAMPLE 2.2

| Element | Surface | Radius of Curvature | Thickness/ Separation | Refractive Index Nd | Constringence V |
|---|---|---|---|---|---|
| I | R1 | +89.77 | | | |
| | | | 15.60 | 1.6204 | 60.3 |
| | R2 | −121.68 | | | |
| | | | 3.80 | | |
| II | R3 | −79.53 | | | |
| | | | 4.13 | 1.7484 | 27.8 |
| | R4 | −675.41 | | | |
| | | | 0.25 | | |
| III | R5 | +58.18 | | | |
| | | | 24.13 | 1.6204 | 60.3 |
| | R6 | −121.46 | | | |
| IV | | | 4.13 | 1.7484 | 27.8 |
| | R7 | −345.58 | | | |
| | | | 16.26 | | |
| VI | R9 | +36.29 | | | |
| | | | 19.55 | 1.7440 | 44.8 |
| | R10 | +107.19 | | | |
| | | | 2.73 | | |
| | R11 | Plano | | | |
| Perspex Window | | | 1.42 | 1.4937 | 57.4 |
| | R12 | Plano | | | |

EFL 45.93      F/0.583      50 Degrees Field of View

EXAMPLE 2.3

| Element | Surface | Radius of Curvature | Thickness/ Separation | Refractive Index Nd | Constringence V |
|---|---|---|---|---|---|
| I | R1 | +68.757 | | | |
| | | | 12.000 | 1.51650 | 64.2 |
| | R2 | +301.066 | | | |
| | | | 14.000 | | |
| | R3 | −61.300 | | | |
| II | | | 5.000 | 1.69895 | 30.1 |
| | R4 | −73.921 | | | |
| | | | 0.500 | | |
| III | R5 | +50.730 | | | |
| IV | | | 25.000 | 1.69100 | 54.8 |
| | R6 | −70.848 | | | |
| | | | 5.000 | 1.80518 | 25.4 |
| | R7 | Plano | | | |
| | | | 6.360 | | |
| VI | R9 | +36.254 | | | |
| | R10 | +143.129 | 20.650 | 1.74400 | 44.8 |
| | | | 1.023 | | |
| Window | | Plano | | | |
| | | | 2.400 | 1.50759 | 61.2 |
| | | Plano | | | |
| | | | 1.598 | | |

EFL +41.23      F/0.54      39 Degrees field of view

In the magnifying lens illustrated in FIG. 2A and with dimensions as given in Example 2.3 the Focal lengths of the front, middle and back parts are as follows:

|  | +5.58F |  |
|---|---|---|
| Front part | +4.10F | −14.78F |
| Middle part | +1.97F | |
|  | +1.13F | −2.12F |
| Back part | +1.45F | |

The following Example 3.1 relates to the embodiment shown in FIG. 3:

EXAMPLE 3.1

| Element | Surface | Radius of Curvature | Thickness/ Separation | Refractive Index Nd | Constringence V |
|---|---|---|---|---|---|
| I | R1 | +110.43 | | | |
|  |  |  | 11.43 | 1.6204 | 60.3 |
|  | R2 | Plano | | | |
|  |  |  | 3.81 | | |
|  | R5 | +47.21 | | | |
| III |  |  | 26.16 | 1.6204 | 60.3 |
|  | R6 | −76.97 | | | |
| IV |  |  | 2.03 | 1.7847 | 26.1 |
|  | R7 | Plano | | | |
| V |  |  | 31.85 | 1.7484 | 27.8 |
|  | R8 | Plano | | | |
|  |  |  | 0.25 | | |
|  | R9 | +41.64 | | | |
| VI |  |  | 15.75 | 1.7440 | 44.8 |
|  | R10 | +282.22 | | | |
|  |  |  | 1.00 | | |
|  | R11 | Plano | | | |
| Perspex Window |  |  | 1.42 | 1.4937 | 57.4 |
|  | R12 | Plano | | | |
| EFL 45.26 | | F/0.575 | | 50 Degree Field of View | |

It will be appreciated that the prism element V may be omitted, as shown in FIG. 4, and the lens re-optimised correspondingly.

The following Examples 5.1 and 5.2 relate to the embodiment shown in FIG. 5:

EXAMPLE 5.1

| Element | Surface | Radius of Curvature | Thickness/ Separation | Refractive Index Nd | Constringence V |
|---|---|---|---|---|---|
| I | R1 | +107.09 | | | |
|  |  |  | 16.00 | 1.5722 | 57.7 |
|  | R2 | −339.62 | | | |
|  |  |  | 13.97 | | |
|  | R3 | −71.63 | | | |
| II |  |  | 6.12 | 1.5786 | 41.1 |
|  | R4 | −95.85 | | | |
|  |  |  | 0.54 | | |
|  | R5 | +58.74 | | | |
| III |  |  | 20.83 | 1.6888 | 49.5 |
|  | R6 | Plano | | | |
| V |  |  | 40.64 | 1.7004 | 30.3 |
|  | R8 | Plano | | | |
|  |  |  | 0.54 | | |
|  | R9 | +41.09 | | | |
| VI |  |  | 9.28 | 1.7440 | 44.8 |
|  | R10 | +137.44 | | | |
|  |  |  | 5.06 | | |
| EFL 51.42 | | F/0.653 | | 44 Degrees Field of View | |

EXAMPLE 5.2

| Element | Surface | Radius of Curvature | Thickness/ Separation | Refractive Index Nd | Constringence V |
|---|---|---|---|---|---|
| I | R1 | +118.31 | | | |
|  |  |  | 15.24 | 1.6204 | 60.3 |
|  | R2 | −399.75 | | | |
|  |  |  | 12.70 | | |
|  | R3 | −70.36 | | | |
| II |  |  | 6.12 | 1.6205 | 36.2 |
|  | R4 | −104.85 | | | |
|  |  |  | 0.54 | | |
|  | R5 | +71.17 | | | |
| III |  |  | 20.83 | 1.6888 | 49.5 |
|  | R6 | Plano | | | |
| V |  |  | 40.64 | 1.7004 | 30.3 |
|  | R8 | Plano | | | |
|  |  |  | 0.54 | | |
|  | R9 | +35.11 | | | |
| VI |  |  | 16.85 | 1.7440 | 44.8 |
|  | R10 | +85.66 | | | |
|  |  |  | 9.97 | | |

EXAMPLE 5.2-continued

| Element | Surface | Radius of Curvature | Thickness/ Separation | Refractive Index Nd | Constringence V |
|---|---|---|---|---|---|
| | EFL. 51.28 | | F/0.651 | 44 Degrees Field of View | |

It will be appreciated that the prism element V may be omitted, as shown in FIG. 6, and the lens re-optimised correspondingly.

Figure 5A:
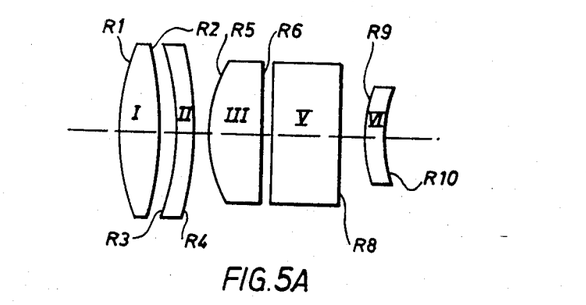
Figure 5B:
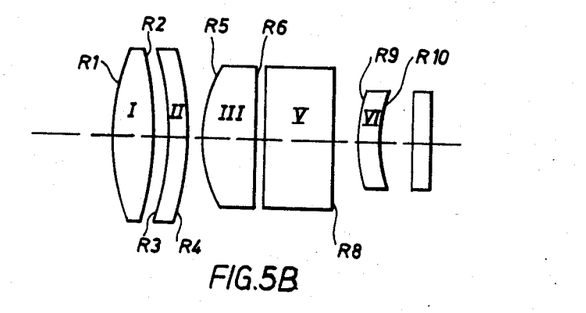

The following Examples 5.3, 5.4 and 5.5, relate to the embodiment illustrated in FIG. 5A which is very similar to the embodiment of FIG. 5 but which has a small gap between the prism V and the element III. Example 5.6 relates to the embodiment of FIG. 5B which is similar to FIG. 5A but has a window added.

EXAMPLE 5.3

| Element | Surface | Radius of Curvature | Thickness/ Separation | Refractive Index Nd | Constringence V |
|---|---|---|---|---|---|
| I | R1 | +82.125 | 16.442 | 1.51650 | 64.2 |
| | R2 | −250.743 | | | |
| | | | 11.286 | | |
| II | R3 | −77.546 | 4.960 | 1.62049 | 36.2 |
| | R4 | −114.011 | | | |
| | | | 0.269 | | |
| III | R5 | +57.839 | 12.102 | 1.69100 | 54.8 |
| | | Plano | | | |
| | | | 0.269 | | |
| V | | Plano | | | |
| | Prism | | 39.215 | 1.80518 | 25.4 |
| | | Plano | | | |
| | | | 0.269 | | |
| VI | R9 | +39.137 | 14.469 | 1.74400 | 44.8 |
| | R10 | +192.864 | | | |
| | | | 1.823 | | |
| Overall EFL = 44.85 | | F/0.57 | | 50 Degrees field of view | |

EXAMPLE 5.4

| Element | Surface | Radius of Curvature | Thickness/ Separation | Refractive Index Nd | Constringence V |
|---|---|---|---|---|---|
| I | R1 | +82.126 | 16.442 | 1.51650 | 64.2 |
| | R2 | −250.745 | | | |
| | | | 11.286 | | |
| II | R3 | −63.480 | 4.960 | 1.62049 | 36.2 |
| | R4 | −75.333 | | | |
| | | | 0.269 | | |
| III | R5 | +57.839 | 12.102 | 1.69100 | 54.8 |
| | | Plano | | | |
| | | | 0.269 | | |
| V | | Plano | | | |
| | Prism | | 39.215 | 1.80518 | 25.4 |
| | | Plano | | | |
| | | | 0.269 | | |
| VI | R9 | +39.137 | 14.470 | 1.88069 | 41.0 |
| | R10 | +167.793 | | | |
| | | | 1.710 | | |
| Overall EFL = 41.91 | | F/O .53 | | 50 Degrees field of view | |

EXAMPLE 5.5

| Element | Surface | Radius of Curvature | Thickness/ Separation | Refractive Index Nd | Constringence V |
|---|---|---|---|---|---|
| I | R1 | +82.126 | 16.442 | 1.51650 | 64.2 |
| | R2 | −250.745 | | | |
| | | | 11.286 | | |
| II | R3 | −64.257 | 4.960 | 1.62049 | 36.2 |
| | R4 | −78.274 | | | |
| | | | 0.269 | | |
| III | R5 | +57.150 | 12.102 | 1.69100 | 54.8 |
| | | Plano | | | |

EXAMPLE 5.5-continued

| Element | Surface | Radius of Curvature | Thickness/ Separation | Refractive Index Nd | Constringence V |
|---|---|---|---|---|---|
| V | Prism | Plano | 0.269 | | |
| | | Plano | 39.215 | 1.80518 | 25.4 |
| VI | R9 | +39.735 | 0.269 | | |
| | R10 | +164.648 | 13.640 | 1.85026 | 32.2 |
| | | | 2.060 | | |
| Overall EFL +42.69 | | F/0.54 | | 50 Degrees field of view | |

EXAMPLE 5.6

| Element | Surface | Radius of Curvature | Thickness/ Separation | Refractive Index Nd | Constringence V |
|---|---|---|---|---|---|
| I | R1 | +95.010 | | | |
| | R2 | −188.253 | 16.400 | 1.51650 | 64.2 |
| | | | 11.250 | | |
| II | R3 | −70.848 | | | |
| | R4 | −103.474 | 5.000 | 1.62049 | 36.2 |
| | | | 0.500 | | |
| III | R5 | +57.150 | | | |
| | | Plano | 13.500 | 1.69100 | 54.8 |
| | | | 0.500 | | |
| V | Prism | Plano | | | |
| | | Plano | 39.200 | 1.80518 | 25.4 |
| VI | R9 | +38.045 | 0.500 | | |
| | R10 | +128.745 | 12.700 | 1.74400 | 44.8 |
| | | | 1.270 | | |
| Window | | Plano | | | |
| | | Plano | 2.380 | 1.50759 | 61.2 |
| | | | 2.090 | | |
| Overall EFL +45.75 | | F/0.56 | | 36 Degrees field of view | |

In the Examples 5.3, 5.4, 5.5 and 5.6 with the dimensions as set forth the focal lengths of the front, middle and back parts are as follows:

Example 5.3

Front part $\overline{+2.71F \quad -9.13F}$  +3.68F

Middle part   +1.86F

Back part   +1.41F

Example 5.4

Front part $\overline{+2.90F \quad -18.37F}$  +3.44F

Middle part   +1.99F

Back part   +1.31F

Example 5.5

Front part $\overline{+2.84F \quad -15.58F}$  +3.46F

Middle part   +1.93F

Back part   +1.36F

Example 5.6

Front part $\overline{+2.72F \quad -8.36F}$  +3.85F

Middle part   +1.81F

Back part   +1.49F

It may be helpful to tabulate the focal lengths of the front, middle and back parts of the examples given in the specification as follows:

| Examples | Front part FL | Middle part FL | Back part FL |
|---|---|---|---|
| 1.1 | +4.81F | +1.86F | +1.38F |
| 1.2 | +4.69F | +1.82F | +1.40F |
| 1.3 | +4.83F | +1.87F | +1.37F |
| 1.4 | +11.33F | +1.88F | +1.16F |
| 2.1 | +4.71F | +1.94F | +1.52F |
| 2.2 | +5.10F | +1.88F | +1.43F |
| 2.3 | +5.58F | +1.97F | +1.45F |
| 3.1 | +3.92F | +1.93F | +1.40F |
| 5.1 | +3.73F | +1.65F | +1.46F |
| 5.2 | +4.60F | +2.01F | +1.36F |
| 5.3 | +3.68F | +1.86F | +1.41F |
| 5.4 | +3.44F | +1.99F | +1.31F |
| 5.5 | +3.46F | +1.93F | +1.36F |
| 5.6 | +3.85F | +1.81F | +1.49F |

From this table it will be noted that the examples illustrate focal lengths for the front part ranging from +3.44F (Example 5.4) to +11.33F (Example 1.4) thus supporting the range of +3F to +12F recited in the main claim.

The focal length for the middle part in the examples ranges from +1.65F (Example 5.1) to +2.01F (Example 5.2) thus supporting the main claim range of +1.6F to +2F.

The focal length for the back part in the examples ranges from +1.16F (Example 1.4) to +1.52F (Example 2.1) thus supporting the range of +1F to +1.75F in the main claim.

It may also be helpful to set forth in tabulated form the specific ratios of R9:R10 of the examples in the specification which are as follows:

| Example | ratio |
|---|---|
| 1.1 | +0.31 |
| 1.2 | +0.22 |
| 1.3 | +0.32 |
| 1.4 | +0.27 |
| 2.1 | +0.21 |
| 2.2 | +0.34 |
| 2.3 | +0.25 |
| 3.1 | +0.15 |
| 5.1 | +0.30 |
| 5.2 | +0.41 |
| 5.3 | +0.20 |
| 5.4 | +0.23 |
| 5.5 | +0.24 |
| 5.6 | +0.29 |

As regards the recitation of zero, this effectively means that the back surface is planar (i.e., having infinite radius of curvature. The disclosure therefore with the specific examples having ratios ranging from +0.15 (Example 3.1) to 0.41 (Example 5.2) support the recited range.

The focal lengths of the convergent elements (I) given in some of the specific examples are as follows:

| Example | FL |
|---|---|
| 1.1 | +2.67F |
| 1.2 | +2.61F |
| 1.3 | +2.69F |
| 1.4 | +4.63F |
| 2.1 | +2.03F |
| 2.2 | +1.86F |
| 5.1 | +2.79F |
| 5.2 | +2.89F |

The above examples with focal lengths ranging from +1.86F (Example 2.2) to +4.63 (Example 1.4) support the specified range of +1.75F to +4.75F.

It may also be helpful to tabulate the focal lengths of some of the divergent elements (II) given in the specific examples as follows:

| Example | FL | Example | FL |
|---|---|---|---|
| 1.1 | −5.68F | 2.1 | −3.20F |
| 1.2 | −5.56F | 2.2 | −2.61F |
| 1.3 | −5.71F | 5.1 | −10.45F |
| 1.4 | −7.62F | 5.2 | −7.17F |

As regards the upper limit of infinity the specification clearly discloses that the relevant divergent element II may be omitted which is equivalent to infinite focal length and therefore its focal length when present can obviously approach infinity.

The focal lengths of the convergent element III given in some of the specific examples are as follows:

| Example | FL | Example | FL |
|---|---|---|---|
| 1.1 | +1.24F | 2.3 | +1.13F |
| 1.2 | +1.21F | 3.1 | +1.13F |
| 1.3 | +1.24F | 5.3 | +1.86F |
| 1.4 | +1.00F | 5.4 | +1.99F |
| 2.1 | +1.07F | 5.5 | +1.93F |
| 2.2 | +1.45F | 5.6 | +1.81F |

Thus in example 1.4 element III has a focal length of +1.00F right at the lower limit of the specified range. As regards the upper limit of +2F the element III has a focal length of 1.99F in example 5.4. It is also explained herein that the divergent element IV may be omitted i.e., effectively have an infinite focal length and example 5.2 has a convergent element III with a focal length of +2.01F, the divergent element IV being omitted. Thus since the element IV can have a focal length approaching infinity, the associated element III can obviously have a focal length approaching the given value of +2.01F.

The focal lengths of the relevant divergent element IV in the specific examples can be tabulated as follows:

| Example | FL | Example | FL |
|---|---|---|---|
| 1.1 | −2.95F | 1.4 | −1.66F |
| 1.2 | −2.89F | 2.1 | −1.91F |
| 1.3 | −2.97F | 2.2 | −5.44F |
| | | 3.1 | −2.15F |

As regards the upper limit of infinity similar explanations to those already made in relation to the divergent element II apply. The description has made it clear that the relevant divergent element IV may be omitted which is equivalent to infinite focal length and therefore its focal length when present can obviously approach infinity. It is clear that the specific examples having focal lengths ranging from −1.66F (Example 1.4) to 5.44F (Example 2.2) support the specific range. Reverting for a moment to the focal length range for the back part of the lens it should be made clear that the preferred upper limit for the focal length is +1.55F though lenses within the specified range of +1F to +1.75F are satisfactory.

It should be made clear that when a lens designer is presented with a requirement for a lens capable of doing a particular job his initial approach is to consider known lenses in the general area to see if there is anything which will meet the specified requirement or whether there is any obvious modification of a known lens design which can be effected to meet the requirement. If this approach, as in the case of the present invention, fails to meet the requirement the designer has to do some original design work and after putting his thoughts and proposals to the test he may reach a lens which is satisfactory for the required purpose. He may then appreciate that the particular resultant lens, although perhaps the optimum for the current specific requirement represents only one example of a family of possible lenses which family he believes to be novel. He therefore devises further examples by using his skill and knowledge to modify the particular lens he has arrived at and making use of work done in arriving at the original lens. This process, which is called iteration, means that the designer ends up with a number of examples which are satisfactory and which indicate how far the family extends. He can then identify ranges from the examples by noting the extremes which he has reached with regard to the relevant factors. In such a case, of which this is one, everything within the specified ranges will work through some embodiments will be more satisfactory than others. By applying his skill and knowledge and where necessary making use of the tools of the trade which nowadays will include a computer the lens designer can exclude those lens values which will not be satisfactory. Further he can be assured that for any value he cares to select in one of the recited ranges there will be values within the other ranges which provide a lens of high utility. There is no reason to doubt

I claim:

1. A biocular magnifying lens faster than f/1.0 having a front part, a middle part, and a back part, the front part being convergent and having a focal length between +3F and +12F, where F is the focal length of the complete lens, the middle part being convergent and having a focal length between +1.6F and +2F, there being a divergent element included in at least one of the front and middle parts, and the back part being convergent and having a focal length between +1F and +1.75F, the back part comprising a component convex towards the front, and in which lens spherical aberration introduced by convergent elements is corrected by at least one front surface of at least one divergent element included in at least one of the front and middle parts, astigmatism is controlled by the spacing between the middle and back parts, and the parts are arranged to effect coma correction.

2. A lens according to claim 1 wherein the back part comprises a meniscus component convex towards the front, the ratio of the radius of curvature of the front surface of the meniscus component to the radius of curvature of its back surface being between +0.5 and zero.

3. A lens according to claim 2 wherein the back part comprises a component convex towards the front and having a back face with a radius of curvature of or approaching infinity such that the component is effectively convex-plano.

4. A lens according to claim 1 wherein the back part comprises a bi-convex component.

5. A lens according to claim 4 wherein the ratio of the radius of curvature of the front surface of the bi-convex component to the radius of curvature of its back surface is between zero and −1.5.

6. A lens according to claim 1 having a prism interposed between the middle part and the back part.

7. A lens according to claim 6 in which the prism is cemented to the back surface of the middle part, said back surface having a radius of curvature of or approaching infinity such that it is effectively planar.

8. A lens according to claim 7 wherein the prism is a 45°, 45°, 90° prism.

9. A lens according to claim 1 wherein the front part comprises a convergent element and a divergent element.

10. A lens according to claim 9 wherein said convergent element has a focal length between +1.75F and +4.75F.

11. A lens according to claim 10 wherein said divergent element has a focal length between −2.5F and infinity.

12. A lens according to claim 1 wherein the middle part comprises a convergent element and a divergent element.

13. A lens according to claim 12 wherein said convergent element and said divergent element are cemented together to form a doublet.

14. A lens according to claim 13 wherein said convergent element is of crown glass and said divergent element is of flint glass.

15. A lens according to claim 12 wherein the convergent element has a focal length between +1F and +2F.

16. A lens according to claim 15 wherein the divergent element has a focal length between −1.5F and infinity.

17. A lens according to claim 1 comprising from front to back, a first positive bi-convex element, a negative meniscus element concave towards the front, a second positive bi-convex element, and a positive meniscus element convex towards the front.

18. A lens according to claim 1 comprising from front to back, a first positive bi-convex element, a second positive bi-convex element, a negative meniscus element concave towards the front, and a positive meniscus element convex towards the front.

19. A lens according to claim 1 comprising from front to back, a first positive bi-convex element, a first negative meniscus element concave towards the front, a second positive bi-convex element, a second negative meniscus element concave towards the front, and a positive meniscus element convex towards the front.

* * * * *

UNITED STATES PATENT AND TRADEMARK OFFICE
CERTIFICATE OF CORRECTION

PATENT NO. : 3,922,072  
DATED : November 25, 1975  
INVENTOR(S) : Philip John Rogers Page 1 of 6

It is certified that error appears in the above-identified patent and that said Letters Patent are hereby corrected as shown below:

Column 4, line 21, cancel "of"

Column 6, Lines 39 and 40, cancel "perspex" and substitute therefor --Perspex--

Column 6, Example 1.1, under "radius of Curvature" cancel "+98.83" and substitute therefor -- -98.83 --

Columns 9, 10, 12 and 14 in Examples 2.1, 2.2, 3.1, 5.1, and 5.3, a horizontal line should be added to separate the last line of the table so that the examples will appear as follows:

EXAMPLE 2.1

| Element | Surface | Radius of Curvature | Thickness/ Separation | Refractive Index Nd | Constringence V |
|---|---|---|---|---|---|
| I | R1 | +80.22 | 15.60 | 1.5165 | 64.2 |
|  | R2 | −129.41 | 3.80 |  |  |
| II | R3 | −91.44 | 4.13 | 1.7004 | 30.3 |
|  | R4 | −571.42 | 0.25 |  |  |
| III | R5 | +55.78 | 30.48 | 1.6204 | 60.3 |
| IV | R6 | −60.70 | 3.50 | 1.7484 | 27.8 |
|  | R7 | −484.54 | 10.04 |  |  |
| VI | R9 | +46.24 | 24.96 | 1.7440 | 44.8 |
|  | R10 | +225.37 | 2.89 |  |  |
| Perspex Window | R11 | Plano | 1.42 | 1.4937 | 57.4 |
|  | R12 | Plano |  |  |  |
| EFL 48.34 |  | F/0.614 |  | 48 Degrees Field of View |  |

EXAMPLE 2.2

| Element | Surface | Radius of Curvature | Thickness/ Separation | Refractive Index Nd | Constringence V |
|---|---|---|---|---|---|
| I | R1 | +89.77 | 15.60 | 1.6204 | 60.3 |
|  | R2 | −121.68 | 3.80 |  |  |
| II | R3 | −79.53 | 4.13 | 1.7484 | 27.8 |
|  | R4 | −675.41 | 0.25 |  |  |
| III | R5 | +58.18 | 24.13 | 1.6204 | 60.3 |
| IV | R6 | −121.46 | 4.13 | 1.7484 | 27.8 |
|  | R7 | −345.58 | 16.26 |  |  |
| VI | R9 | +36.29 | 19.55 | 1.7440 | 44.8 |
|  | R10 | +107.19 | 2.73 |  |  |
| Perspex Window | R11 | Plano | 1.42 | 1.4937 | 57.4 |
|  | R12 | Plano |  |  |  |
| EFL 45.93 |  | F/0.583 |  | 50 Degrees Field of View |  |

UNITED STATES PATENT AND TRADEMARK OFFICE
CERTIFICATE OF CORRECTION

PATENT NO. : 3,922,072
DATED : November 25, 1975
INVENTOR(S) : Philip John Rogers It is certified that error appears in the above-identified patent and that said Letters Patent are hereby corrected as shown below:

EXAMPLE 3.1

| Element | Surface | Radius of Curvature | Thickness/ Separation | Refractive Index Nd | Constringence V |
|---|---|---|---|---|---|
| I | R1 | +110.43 | 11.43 | 1.6204 | 60.3 |
| | R2 | Plano | 3.81 | | |
| III | R5 | +47.21 | 26.16 | 1.6204 | 60.3 |
| IV | R6 | −76.97 | 2.03 | 1.7847 | 26.1 |
| V | R7 | Plano | 31.85 | 1.7484 | 27.8 |
| | R8 | Plano | 0.25 | | |
| VI | R9 | +41.64 | 15.75 | 1.7440 | 44.8 |
| | R10 | +282.22 | 1.00 | | |
| Perspex Window | R11 | Plano | 1.42 | 1.4937 | 57.4 |
| | R12 | Plano | | | |

EFL 45.26    F/0.575    50 Degree Field of View

EXAMPLE 5.1

| Element | Surface | Radius of Curvature | Thickness/ Separation | Refractive Index Nd | Constringence V |
|---|---|---|---|---|---|
| I | R1 | +107.09 | 16.00 | 1.5722 | 57.7 |
| | R2 | −339.62 | 13.97 | | |
| II | R3 | −71.63 | 6.12 | 1.5786 | 41.1 |
| | R4 | −95.85 | 0.54 | | |
| III | R5 | +58.74 | 20.83 | 1.6888 | 49.5 |
| V | R6 | Plano | 40.64 | 1.7004 | 30.3 |
| | R8 | Plano | 0.54 | | |
| VI | R9 | +41.09 | 9.28 | 1.7440 | 44.8 |
| | R10 | +137.44 | 5.06 | | |

EFL 51.42    F/0.653    44 Degrees Field of View

UNITED STATES PATENT AND TRADEMARK OFFICE
CERTIFICATE OF CORRECTION

PATENT NO. : 3,922,072
DATED : November 25, 1975
INVENTOR(S) : Philip John Rogers It is certified that error appears in the above-identified patent and that said Letters Patent are hereby corrected as shown below:

EXAMPLE 5.3

| Element | Surface | Radius of Curvature | Thickness/ Separation | Refractive Index Nd | Constringence V |
|---|---|---|---|---|---|
| I | R1 | +82.125 | 16.442 | 1.51650 | 64.2 |
| | R2 | −250.743 | 11.286 | | |
| II | R3 | −77.546 | 4.960 | 1.62049 | 36.2 |
| | R4 | −114.011 | 0.269 | | |
| III | R5 | +57.839 | 12.102 | 1.69100 | 54.8 |
| | | Plano | 0.269 | | |
| V | Prism | Plano | 39.215 | 1.80518 | 25.4 |
| | | Plano | 0.269 | | |
| VI | R9 | +39.137 | 14.469 | 1.74400 | 44.8 |
| | R10 | +192.864 | 1.823 | | |

Overall EFL = 44.85    F/0.57    50 Degrees field of view

Column 14, Example 5.4, the first column should be identified by the word --Element-- at the top; the second column should be identified by the word --Surface-- at the top; and in the fourth column, the word "Refractive" should be canceled; in the fifth column, the word --Refractive-- should be added before "Index" ; and a horizontal line should be added to separate the last line of the table from the remainder of the table so that Example 5.4 will appear as follows:

UNITED STATES PATENT AND TRADEMARK OFFICE
CERTIFICATE OF CORRECTION

PATENT NO. : 3,922,072
DATED : November 25, 1976
INVENTOR(S) : Philip John Rogers It is certified that error appears in the above-identified patent and that said Letters Patent are hereby corrected as shown below:

EXAMPLE 5.4

| Element | Surface | Radius of Curvature | Thickness/ Separation | Refractive Index Nd | Constringence V |
|---|---|---|---|---|---|
| I | R1 | +82.126 | 16.442 | 1.51650 | 64.2 |
|   | R2 | −250.745 |  |  |  |
|   |    |          | 11.286 |  |  |
| II | R3 | −63.480 | 4.960 | 1.62049 | 36.2 |
|    | R4 | −75.333 |  |  |  |
|    |    |         | 0.269 |  |  |
| III | R5 | +57.839 | 12.102 | 1.69100 | 54.8 |
|     |    | Plano   |  |  |  |
|     |    |         | 0.269 |  |  |
| V | Prism | Plano | 39.215 | 1.80518 | 25.4 |
|   |       | Plano |  |  |  |
|   |       |       | 0.269 |  |  |
| VI | R9 | +39.137 | 14.470 | 1.88069 | 41.0 |
|    | R10 | +167.793 |  |  |  |
|    |     |          | 1.710 |  |  |

Overall EFL = 41.91    F/O .53    50 Degrees field of view

UNITED STATES PATENT AND TRADEMARK OFFICE
CERTIFICATE OF CORRECTION

PATENT NO. : 3,922,072

DATED : November 25, 1976

INVENTOR(S) : Philip John Rogers

It is certified that error appears in the above-identified patent and that said Letters Patent are hereby corrected as shown below:

Page 5 of 6

Columns 14 and 15, a horizontal line should be added to separate the last line from the remainder of the tables so that Examples 5.5 and 5.6 will appear as follows:

EXAMPLE 5.5-continued

| Element | Surface | Radius of Curvature | Thickness/ Separation | Refractive Index Nd | Constringence V |
|---|---|---|---|---|---|
|   |       |       | 0.269 |         |      |
| V | Prism | Plano | 39.215 | 1.80518 | 25.4 |
|   |       | Plano | 0.269 |         |      |
| VI | R9  | +39.735 | 13.640 | 1.85026 | 32.2 |
|    | R10 | +164.648 | 2.060 |         |      |
| Overall EFL +42.69 | | F/0.54 | | 50 Degrees field of view | |

EXAMPLE 5.6

| Element | Surface | Radius of Curvature | Thickness/ Separation | Refractive Index Nd | Constringence V |
|---|---|---|---|---|---|
| I   | R1  | +95.010  | 16.400 | 1.51650 | 64.2 |
|     | R2  | -188.253 | 11.250 |         |      |
| II  | R3  | -70.848  | 5.000  | 1.62049 | 36.2 |
|     | R4  | -103.474 | 0.500  |         |      |
| III | R5  | +57.150  | 13.500 | 1.69100 | 54.8 |
|     |     | Plano    | 0.500  |         |      |
| V   | Prism | Plano  | 39.200 | 1.80518 | 25.4 |
|     |     | Plano    | 0.500  |         |      |
| VI  | R9  | +38.045  | 12.700 | 1.74400 | 44.8 |
|     | R10 | +128.745 | 1.270  |         |      |
| Window | | Plano | 2.380 | 1.50759 | 61.2 |
|        | | Plano | 2.090 |         |      |
| Overall EFL +45.75 | | F/0.56 | | 36 Degrees field of view | |

UNITED STATES PATENT AND TRADEMARK OFFICE
CERTIFICATE OF CORRECTION

PATENT NO. : 3,922,072
DATED : November 25, 1976
INVENTOR(S) : Philip John Rogers It is certified that error appears in the above-identified patent and that said Letters Patent are hereby corrected as shown below:

Column 18, line 28, cancel "specific" and substitute therefor --specified--

Column 18, line 60, cancel "through" and substitute therefor --though--

Signed and Sealed this sixth Day of April 1976

[SEAL]

Attest:

RUTH C. MASON
Attesting Officer

C. MARSHALL DANN
Commissioner of Patents and Trademarks